Figure 1:
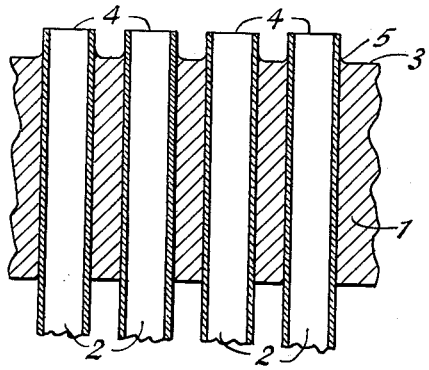

Feb. 4, 1964     O. R. CARPENTER     3,120,400
WELDED TUBULAR ATTACHMENT TO A PRESSURE
MEMBER AND METHOD OF MAKING SAME
Original Filed Jan. 25, 1954     2 Sheets-Sheet 1

INVENTOR
Otis R. Carpenter
BY
ATTORNEY

INVENTOR
Otis R. Carpenter
BY
ATTORNEY 3,120,400
WELDED TUBULAR ATTACHMENT TO A PRESSURE MEMBER AND METHOD OF MAKING SAME
Otis R. Carpenter, Barberton, Ohio, assignor to The Babcock & Wilcox Company, New York, N.Y., a corporation of New Jersey
Continuation of abandoned application Ser. No. 405,959, Jan. 25, 1954. This application July 27, 1960, Ser. No. 46,871
14 Claims. (Cl. 285—137)

This invention relates to an attachment between a tube and a pressure member, more particularly it relates to a novel welded attachment or joint and method of making same and constitutes a continuation of the application Serial No. 405,959, filed January 25, 1954, and now abandoned.

Many of the present day processes for producing power and chemicals utilize high temperatures and pressures to accomplish their purposes. The tubular heat exchange equipment which performs in these processes is subject to operating conditions never before encountered, and the attachment of the tubes to pressure members requires very careful considerations as they are most likely to be the initial point of failure. It is therefore important that the attachment be made mechanically sound in such a manner as to withstand high temperatures, pressures, and cyclic variations thereof. Welding of tubes to pressure members provides the most sound mechanical attachment. It is to the improvement of sound welding attachments that this invention applies.

One of the important features of a satisfactory tube attachment is leak tightness under all conditions of operation. It is not to be assumed that satisfactory mechanical strength will provide a leak tight boundary. Weld deposits, because they are molten when initially deposited, upon cooling are considered to be more porous than wrought metals, i.e. those that have been drawn, forged, extruded, or worked in some way. The porosity is not of such magnitude as to allow a perceptible stream of leaking fluid to be discharged therethrough, but in some types of application even small porosity leakage becomes objectionable through weld deposits less than 1½ tube wall thickness ($t$). A satisfactory well will, therefore, require a leak path through the weld deposit of greater than 1½$t$. Ordinarily the workpieces are wrought metals and as such, these show less propensity for leakage than the weld. On this basis the 1$t$ of tube wall is considered roughly equal to 1½$t$ of weld deposit.

In summation, a satisfactory tubular attachment to a pressure member should be both mechanically satisfactory and provide for a minimum leakage.

The present invention is a tube attachment to a pressure member and a method of making the same, including high quality welding.

Additionally, the invention provides an attachment which is leak proof.

A further advantage of the invention is that the accessibility of the weld root is increased to provide optimum welding conditions.

A still further advantage is that the invention provides a method of welding a plurality of tubular elements which involves a long continuous weld path, thereby avoiding the slag inclusions due to frequent stops and starts which are inherent in welding practices having many short weld paths.

In addition, the present invention is adaptable for use with any size tube and/or tube spacing to improve the efficiency of the tubular attachment to a pressure member.

Figure 2:
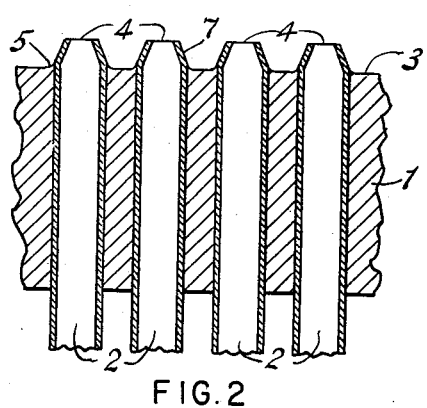
Figure 4:
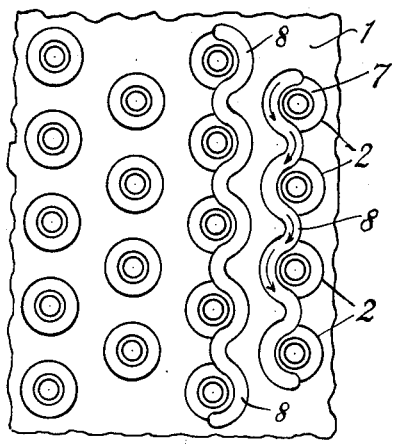
Figure 5:
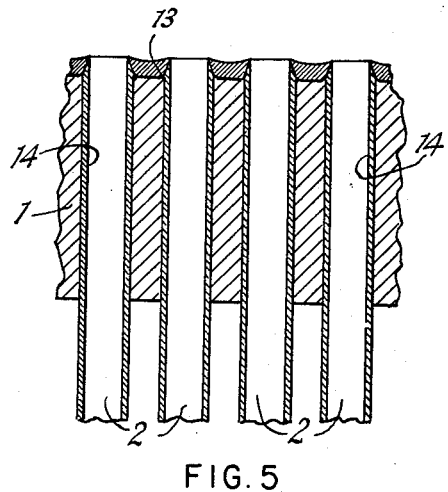
Figure 3:
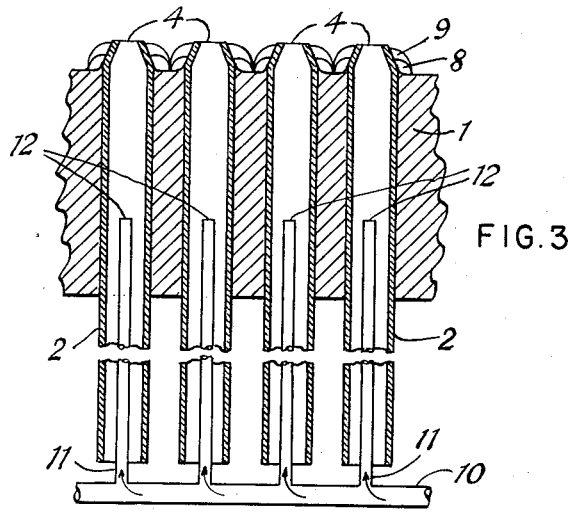
Figure 6:
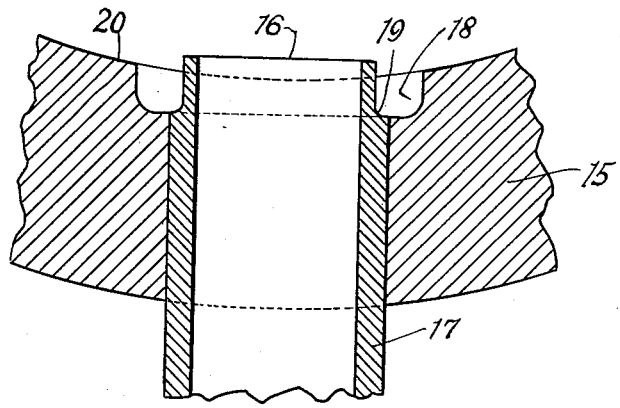
Figure 7:
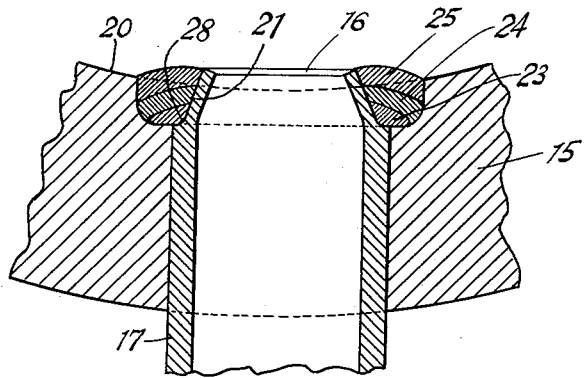
Figure 8:
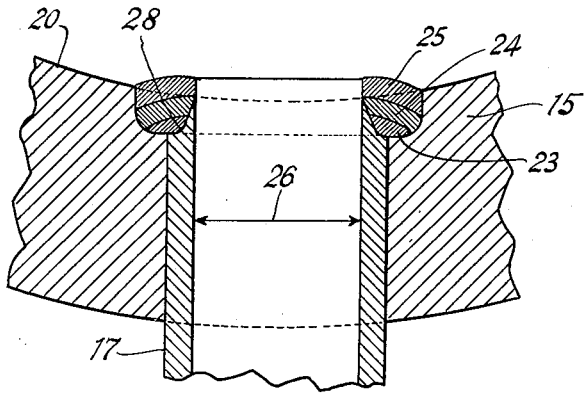

For an understanding of the invention principles, reference is made to the following detailed description of typical embodiments of the invention methods as illustrated in the accompanying drawings:

In the drawings:
FIGS. 1, 2 and 3 are sectional elevations of one example of tubular elements and pressure member illustrating successive steps in carrying out the invention method.
FIG. 4 is a plan view illustrating the method of depositing multiple welds in a single continuous operation.
FIG. 5 is a sectional elevation of the completed tubular attachment of FIGURES 1, 2 and 3.
FIGS. 6, 7 and 8 are sectional elevations of a second illustrative embodiment of the invention, showing successive steps.

FIGS. 1 through 5 illustrate the progressive steps in making one embodiment of a tube attachment. A pressure member 1 is machined or otherwise formed with a number of tube seats into which are fitted the tubes 2. The diameter of each tube seat is slightly larger than the diameter of its tube 2 so that when the tube is placed therethrough the surface of the tube will be in sliding contact with the surface of the tube seat. The pressure member 1 is also machined or otherwise formed on its face 3 in such a manner that adjacent and contiguous to each tube seat there remains a rim of metal which in section appears as a segment of an arc. This rim of metal is a fillet 5. The tubes 2 are fitted into the tube seats in such a way that the tube ends 4 extend beyond the face 3 of the pressure member 1. The resulting junction of each tube end 4 with the face 3 and the fillet 5 of the pressure member 1 in section form a right angle with the apex portion being a segment of an arc and having the base in a plane substantially perpendicular to the longitudinal centerline of the tubes 2. After the tubes 2 are positioned in the above described manner each tube is expanded so as to force the outer surface of the tube against the inner surface of the tube seat. Thereby the tubes become mechanically bound to the pressure member. The expanding is accomplished by any suitable tool, such as a rotary expander or ball drift expander.

In FIG. 2 there is shown the tubes 2 and the pressure member 1 after the projecting tube ends 4 have been deformed or otherwise formed into frustums of cones 7. The deforming operation has now so changed the junction of the tube ends and the tube face so that in section there are formed obtuse angles each having a segment of arc 5 at its apex. Therefore, there is now presented, for each tube an annular weld groove formed by a pressure member face 3, fillet 5, and a conical tube end 7.

FIG. 3 shows the same tube attachments after the next step of the illustrative method. Into the opposite ends of the tubes 2 there has been inserted small tubes 12 which are attached to a manifold 10. A cooling fluid such as air flows from the manifold 10 through tubes 11 and is discharged through the tube ends 4. The tube ends 4 and pressure member 1 are joined by successive weld deposits 8 and 9. During the welding operation the cooling fluid which flows through the tube ends 4 maintains the metal of the tube ends at a low temperature to prevent weld metal burnthrough and overheating of the pressure member and tube wall to such an extent that undesirable metal structure results.

In FIG. 5 there is shown a sectional elevation of the completed tubular attachment. To accomplish this result, the tube ends shown in FIG. 3 are reamed or drilled to the internal diameter 14 of the tubes 2. This causes the removal of the large portion of the metal of the tube ends 4. Each weld juncture 13 upon completion of the method appears, in section, as an obtuse angle having a segment of an arc at its apex.

FIG. 4 is a plan view of the pressure member 1 and tubes 2, illustrating the initial weld deposition pass of the preferred welding operation. A weld deposition pass is herein defined as a continuous weld metal deposit which would result from any continuous and uninterrupted melting of the metal of a weld rod. A weld deposition pass would be completed upon any interruption to a continuous weld path. The weld deposit 8 is laid down during a single pass in a sinuous welding operation continuously around a plurality of tube ends, whereby at least a substantial peripheral portion of each of the pertinent tube ends is joined to the pressure member. Further passes would be made until there is sufficient weld metal uniting the tubes 2 to the pressure member 1 throughout the entire circumference of the welding groove to give a mechanically sound and leak proof tubular attachment. Each weld pass may be made as shown in FIG. 4 or alternately could be made by encircling the complete periphery of the tube or any portion thereof and then going on to an adjacent tube. The important feature of welding in this manner is that the weld metal is deposited continuously over a path of substantial length. The continuous deposition of weld metal reduces the number of stops and starts which would have to be made if each tube were welded individually. These stops and starts are reduced in order to minimize the number of slag inclusions and other weld imperfections which result from them. In the installation where small tubes, in the order of one half inch diameter, are joined it is estimated that the number of stops and starts can be reduced by as much as 75 percent. The welds resulting from this method of deposition will accordingly be improved by that same percentage.

The method illustrated in FIGS. 1–5 is primarily directed to the securing of a high quality weld. This weld is made possible by forming the weld groove so that there is an obtuse angle presented to the welder. The obtuse angle gives the welder complete accessibility during all phases of the welding process. By virtue of this fact the welder can exercise the proper amount of vigilance to assure a weld free of imperfections. Also, because the root of the weld, i.e., apex of the weld angle, presents a broad weld base due to the fillet 5, imperfections in the first weld deposit are minimized. The combination of the apex angle and the fillet create conditions which accrue to the benefit of the welder and makes possible high quality welds.

A second illustrative embodiment of the invention is shown in the FIGS. 6–8, involving illustrations of the various steps of the method. In FIG. 6 the pressure member 15 has been formed with a tube seat therethrough and in the face 20 there is an annular L shaped groove 18 formed continuous with the periphery of the tube seat and having the base of the groove in a plane substantially perpendicular to the longitudinal centerline of the tube 17. The tube 17 has an end 16 which has been formed with an L shape annular groove 19 to a depth where there remains a tube wall thickness not greater than 0.125 inch. The tube 17 is positioned in the tube seat of the pressure member 15 so that the base of the L groove 19 is in the same plane as the base of the pressure member groove 18. The tube 17 is next expanded into the pressure member 15. The tube end 16 is then formed into a frustrum cone 21 (FIG. 7). This action presents a weld groove which in section, has an obtuse angle having a segment of an arc as its apex. Weld deposits 23, 24, 25 are then made successively, thereby uniting the tube 17 to the pressure member 15.

In FIG. 8 there is shown the completed attachment in the final form after reaming or drilling the tube end 16 to the internal diameter 26 of the tube 17.

The tube attachment as shown in FIG. 8 is similar to that shown in FIG. 5 and is also primarily concerned with the attainment of a good high quality weld. This weld is the direct result of the improved weld accessibility obtained by the forming of the tube and pressure member in such a manner that there is an obtuse angle welding groove having a segment of an arc at its apex. The welder, during the entire operation can see the junction of the tube and the pressure member and he can therefore, exercise a maximum of quality control on the weld. The weld groove is formed so that there are no sharp corners which may propagate weld cracking under high stress loading.

An important requirement in tube attachments for high pressure and/or high temperature heat exchangers, is that the weld attachment be leak proof. The attachment herein described achieves that result by making the length of the junction of the weld metal and the tube greater than the thickness of the tube wall. The tube wall being of wrought metal, i.e., that it has been drawn, forged, extruded or worked in some way, has less propensity for fluid leakage than the weld metal and, as can be seen from FIGS. 5 and 8 of the completed joints, the length of the leak path is substantially greater than the thickness of the tube.

The improved method provides a tube attachment which not only has a high degree of mechanical strength, but also has excellent leak proof characteristics.

It should be understood that the invention as illustrated in the above embodiments would not necessarily include all of the described details of all of the steps of the illustrative method. For instance, in case of very thick tube walls, the frusto-conical tube end might be formed by machining the tube end and as such would not require machining after welding. Also the attachment could be made without the use of fluid cooling during the welding operation.

While in accordance with the provisions of the statutes, I have illustrated and described herein specific forms of the invention now known to me, those skilled in the art will understand that changes may be made in the form of the apparatus and method disclosed without departing from the spirit of the invention as covered by my claims and that certain features of my invention may sometimes be used to advantage without a corresponding use of the other features.

What is claimed is:

1. Fusion welded tube attachments to a pressure member which comprises a plurality of tube seats formed through the wall of the pressure member, fillets formed in the face of the pressure member contiguous with the periphery of the tube seats, frusto-conically shaped tube ends fitted into said tube seats and so positioned that the conical surfaces are tangent to the arc of the fillets whereby the surfaces of the tube ends projecting beyond said pressure member and the outer face of said pressure member form obtuse angled weld grooves with their apexes defining a segment of an arc, and fusion welds in successive passes completely uniting said tubes and pressure member, each of said weld passes being sinuous and continuous around at least a substantial peripheral portion of a plurality of the weld grooves.

2. A method of attaching a tube in the tube seat of a pressure member which includes forming the tube end into a frustum of a cone with the surfaces of the tube end and a face of the pressure member forming an obtuse angled welding groove, rounding out the surface of the pressure member at the junction of said tube and pressure member to form a fillet contiguous with the tube end and filling the welding groove with weld metal to join the tube and pressure member.

3. A method of attaching a plurality of tubes in respective tube seats of a pressure member which includes forming the tube ends into frustums of cones with the surfaces of the tubes and a face of the pressure member forming obtuse angled welding grooves with a tube to weld junction line greater than $1\frac{1}{2}t$, where $t$ is the wall thickness of the tubes, uniting the tubes and pressure member by successive weld deposition passes, said passes being continuous over a plurality of the weld grooves with the depositions extending over at least substantial peripheral parts of said grooves.

4. A method of attaching a tube to a pressure member which includes forming a tube seat through said member, fitting the tube into the tube seat to a position where the end of the tube extends beyond the face of the pressure member, expanding the tube into the tube seat, forming said tube end into a frustum of a cone such that the surfaces of the tube end and the face of the pressure member form an obtuse angled welding groove with a tube to weld junction line greater than 1½t, where t is the wall thickness of the tube, flowing a cooling fluid through the tube in a direction toward said tube end, uniting the tube and pressure member by a weld deposit, opening the tube end to the internal diameter of the tubes and maintaining the tube to weld junction line to at least 1½t.

5. A method of attaching a plurality of tubes to a pressure member which includes forming tube seats through said pressure member; forming fillets in the face of said member contiguous with the periphery of the tube seats; fitting tubes into said tube seats to a position where the ends of the tubes extend beyond said face of the pressure member; expanding the tubes into the tube seats; forming said tube ends into a frustum of a cone such that the surfaces of the tube ends, the face of the pressure member, and the fillets form obtuse angled welding grooves with their apex being a segment of an arc and with the tube to weld junction line being greater than 1½t, where t is the wall thickness of the tube; flowing a cooling fluid through the tubes in a direction toward said tube ends; uniting the tubes and pressure member by depositing welds in said weld grooves; and opening the tube ends to the internal diameter of the tubes and maintaining the tube to weld junction line to at least 1½t.

6. A method of attaching tubes to a pressure member as in claim 5 with the welds uniting the tubes and pressure member by successive weld deposition passes, said passes being sinuous and continuous over a plurality of the weld grooves with the depositions extending over at least substantial peripheral parts of said grooves.

7. A method of attaching a tube to a pressure member which includes forming a tube seat through said pressure member, forming an annular groove in the surface of the member concentric and contiguous with the tube seat, forming an annular circumferential groove of L-shaped cross section in the outer surface of the tube adjacent the end thereof so that the tube wall thickness is reduced, fitting said tube into the tube seat to a position such that the base of the L is in the same plane as the base of the pressure member groove, forming the tube end into frustum of a cone such that the conical surface and the base of the tube groove form an obtuse angled welding groove with the apex being a segment of an arc; and filling said welding groove with weld deposit to join the tubes and pressure member.

8. A method of attaching a tube to a pressure member which includes forming a tube seat through said pressure member, forming an annular groove in the surface of the member concentric and contiguous with the tube seat, forming an annular circumferential groove of L-shaped cross section in the outer surface of the tube adjacent the end thereof so that the tube wall thickness is reduced, fitting said tube into the tube seat to a position such that the tube extends beyond the pressure member groove, expanding the tube into the tube seats, forming the tube end into frustum of a cone such that the conical surface and the base of the tube groove form an obtuse angled welding groove with the apex being a segment of an arc, flowing a cooling fluid through the tube in a direction toward said tube end, filling said welding groove with weld deposit to join the tube and pressure member, and opening said tube end to the inner diameter of the tubes.

9. A method of attaching a tube to a pressure member which includes forming a tube seat through said member, forming the tube end and the pressure member face in such a manner that when the tube is fitted into the tube seat in operative relationship therewith there is formed an obtuse angle weld groove with the tube to weld junction line being greater than 1½t, where t is the wall thickness of the tube, rounding out the surface of said member so that the junction of said tube and member is defined by a segment of an arc in cross-section continuous with the tube end, and filling said weld groove with weld metal to join the tube and pressure member.

10. A method of attaching a tube to a pressure member which includes forming a tube seat through said member, forming the tube end and the pressure member face in such a manner that when the tube end is fitted into the tube seat in operative relationship there is formed an obtuse angled welding groove having a tube to weld junction line greater than 1½t, wherein t is the wall thickness of the tube, rounding out the surface of said member so that the junction of said tube and member is defined by a segment of an arc and having the base of the angle in a plane substantially perpendicular to the longitudinal center line of the tube, and filling said weld groove with weld metal to join the tube and pressure member.

11. A method of making a fluid tight connection of a plurality of tubes in closely spaced tube seats of a pressure member comprising fitting the tubes into corresponding tube seats with an end of each tube extending beyond the end of the adjacent face of the pressure member, expanding each tube so positioned into its respective tube seat so as to force the outer cylindrical surface of the tube adjacent said extending end thereof against the inner surface of its respective tube seat, and welding the junction between the extending end of each of said tubes and the face of the pressure member by a fusion arc weld depositing weld metal in a continuous sinuous path extending along a substantial segmental length of the junctions of successive tubes and the face of the member.

12. The method as defined in claim 11, including the step of repeating said fusion arc weld operation along substantially the remaining unwelded segmental lengths of the junctions of said successive tubes and the face of said member continuous sinuous well path.

13. A method of making a fluid tight connection of a plurality of tubes in closely spaced tube seats of a pressure member comprising, fitting the tubes into corresponding tube seats with an end of each tube extending beyond the end of the adjacent face of the pressure member, forming the tube ends into frustums of cones with the surfaces of the tubes and the face of the pressure member to define obtuse angled welding grooves thereat, and welding the junction between each of said tubes in the adjacent face of the pressure member by a fusion arc weld depositing weld metal in a continuous, sinuous path extending along a substantial segmental length of the junctions of successive tubes and the face of the member.

14. Fusion welded tube attachments to a pressure member which comprises a plurality of tube seats formed through the wall of the pressure member, fillets formed in the face of the pressure member contiguous with the periphery of the tube seats, a tube having an expanded connection with each of said tube seats, each of said tubes having an end portion extending beyond its respective tube seat whereby the outer surface of the respective tube ends projecting beyond said pressure member and the outer face of said pressure member form therebetween an angle having an apex defined as a segment of an arc, and a plurality of continuous welds disposed in successive layers, each of said layers extending in a sinuous pass about a substantial peripheral portion of a plurality of said tubes and said pressure member to form a complete united tube attachment.

References Cited in the file of this patent

UNITED STATES PATENTS

| | | |
|---|---|---|
| 993,883 | Schickert | May 30, 1911 |
| 1,935,063 | Scott | Nov. 14, 1933 |
| 1,991,429 | Straty | Feb. 19, 1935 |
| 2,101,405 | McKeever | Dec. 7, 1937 |
| 2,262,212 | Stone | Nov. 11, 1941 |
| 2,451,786 | Villiger | Oct. 19, 1948 |
| 2,721,379 | Chapman | Oct. 25, 1955 |
| 2,832,570 | Schoessow | Apr. 29, 1958 |

FOREIGN PATENTS

| | | |
|---|---|---|
| 660,588 | Great Britain | Nov. 7, 1951 |